(12) United States Patent
McKenzie et al.

(10) Patent No.: US 11,194,701 B2
(45) Date of Patent: Dec. 7, 2021

(54) IDENTIFYING SOFTWARE INTERACTION DEFECTS USING DIFFERENTIAL SPEED PROCESSORS

(71) Applicant: INTERNATIONAL BUSINESS MACHINES CORPORATION, Armonk, NY (US)

(72) Inventors: Kevin McKenzie, Poughkeepsie, NY (US); Aaron Kippins, Beacon, NY (US); Daniel Rosa, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 16/871,236

(22) Filed: May 11, 2020

(65) Prior Publication Data

US 2021/0349806 A1 Nov. 11, 2021

(51) Int. Cl.
*G06F 9/44* (2018.01)
*G06F 11/36* (2006.01)

(52) U.S. Cl.
CPC ........ *G06F 11/368* (2013.01); *G06F 11/3692* (2013.01)

(58) Field of Classification Search
None
See application file for complete search history.

(56) References Cited

U.S. PATENT DOCUMENTS

| 7,673,181 | B1 | 3/2010 | Lindo et al. | |
| 7,793,269 | B2* | 9/2010 | Singonahalli | G06F 11/3688 |
| | | | | 717/131 |
| 7,861,228 | B2* | 12/2010 | Osecky | G06F 11/1633 |
| | | | | 717/126 |
| 2011/0047364 | A1* | 2/2011 | Koju | G06F 9/3842 |
| | | | | 712/228 |
| 2012/0042145 | A1* | 2/2012 | Sehr | G06F 21/53 |
| | | | | 711/163 |
| 2013/0185524 | A1 | 7/2013 | Sakada | |
| 2015/0046752 | A1* | 2/2015 | Cain, III | G06F 11/1474 |
| | | | | 714/38.1 |
| 2016/0232077 | A1 | 8/2016 | Hu et al. | |
| 2016/0321103 | A1* | 11/2016 | O'Dell | G06F 11/3688 |
| 2019/0369895 | A1* | 12/2019 | Israni | G06F 3/0635 |

* cited by examiner

*Primary Examiner* — Wei Y Zhen
*Assistant Examiner* — Lanny N Ung
(74) *Attorney, Agent, or Firm* — Cantor Colburn LLP; Teddi Maranzano

(57) ABSTRACT

Aspects of the invention include methods, systems and computer program products for identifying interaction software defects. Aspects include singly executing a first testcase at a normal processing speed and singly executing a second testcase at the normal processing speed. Aspects also include simultaneously executing the first testcase at a first processing speed and a second testcase at a second processing speed. Based on determining the single and simultaneous testcase results do not match, aspects further include creating an error notification.

17 Claims, 4 Drawing Sheets

IDENTIFYING SOFTWARE INTERACTION DEFECTS USING DIFFERENTIAL SPEED PROCESSORS

BACKGROUND

The present invention generally relates to software testing, and more specifically, to identifying software defects using differential speed processors.

Interaction defects are problems between programs that only occur under very specific circumstances. Interaction defects can be between independent programs or multiple instances of the same program that result in a program producing an incorrect result. A common example of an interaction defect is a race condition. In a race condition, multiple programs use the same area of memory, where depending on the sequencing sometimes all programs get correct results and other times one or more programs get incorrect results. These defects are difficult to discover and reproduce, as the system state has to be set very precisely, and the tester often cannot create the required system state. In the industry, testcases use techniques such as breakpoints to create precise system state to drive tests to detect interaction defects. With breakpoints, testcases can wait until a specific system state is reached and then resume execution. Testcases using breakpoints require testers have deep internal program knowledge.

SUMMARY

Embodiments of the present invention are directed to identifying software interaction defects using differential speed processors. A non-limiting example computer-implemented method includes singly executing a first testcase at a normal processing speed and singly executing a second testcase at the normal processing speed. The method also includes simultaneously executing the first testcase at a first processing speed and a second testcase at a second processing speed. Based on determining the single and simultaneous testcase results do not match, the method further includes creating an error notification.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention provide methods, systems, and computer program products for identifying software interaction defects using differential speed processors. In accordance with one or more embodiments of the present invention, the interactions between multiple computer programs are tested by executing programs at the same time on processors that are operating at different processing speeds. Executing the programs on processors that are operating at different processing speeds, along with CPU timeslicing for ready to run programs, increases the chances of detecting interaction defects. In addition, by using differential speed processors, problems can be found between any interacting computer programs under test.

In exemplary embodiments, the interaction of multiple computer programs are tested by simultaneously executing the programs on different processors that are operating at different speeds. In one embodiment, the processors have different operating speeds. In another embodiment, the processors have the same operating speed, but inject no-op instructions into the processing pipeline of one of the processors to adjust the effective speed to the processor. For example, adding no-op instructions effectively decreases processor speed and removing no-op instructions effectively increases processor speed.

Figure 1:
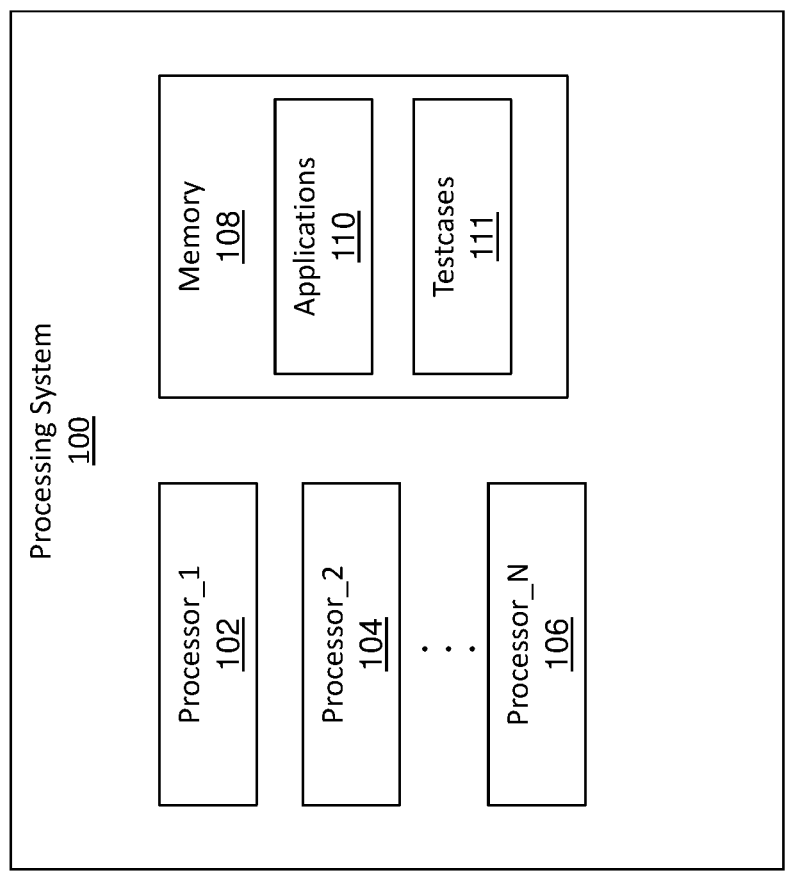
FIG. 1 depicts a block diagram of a system for identifying software interaction defects using differential speed processors according to one or more embodiments of the present invention.

Turning now to FIG. 1, a block diagram of a system 100 for identifying software interaction defects using differential speed processors is generally shown in accordance with one or more embodiments of the present invention. As illustrated, the system 100 includes a plurality of processors (Processor_1 102, Processor_2 104 through Processor_N 106). In one embodiment, the processors are separate processors. In another embodiment, the processors are different processing cores of a single processor. In exemplary embodiments, at least two of the processors are capable of executing instructions at different processing speeds. In one embodiment, the physical processing speed of at least two of the processors is different. In another embodiment, the physical processing speed of the processors is the same and the effective processing speed of the processors is capable of being adjusted using no-op instructions.

The system 100 further includes a memory 108 that is configured to store one or more applications 110 consisting of one or more applications programs and testcases 111 consisting of one or more testcase programs to be executed by processors. In exemplary embodiments, testcases execute singly at normal processing speed to minimize interactions. Then multiple testcases are run simultaneously at different processing speeds to drive application program interactions.

Singly and simultaneous testcase results are compared and any differences indicate an error has occurred.

Figure 2:
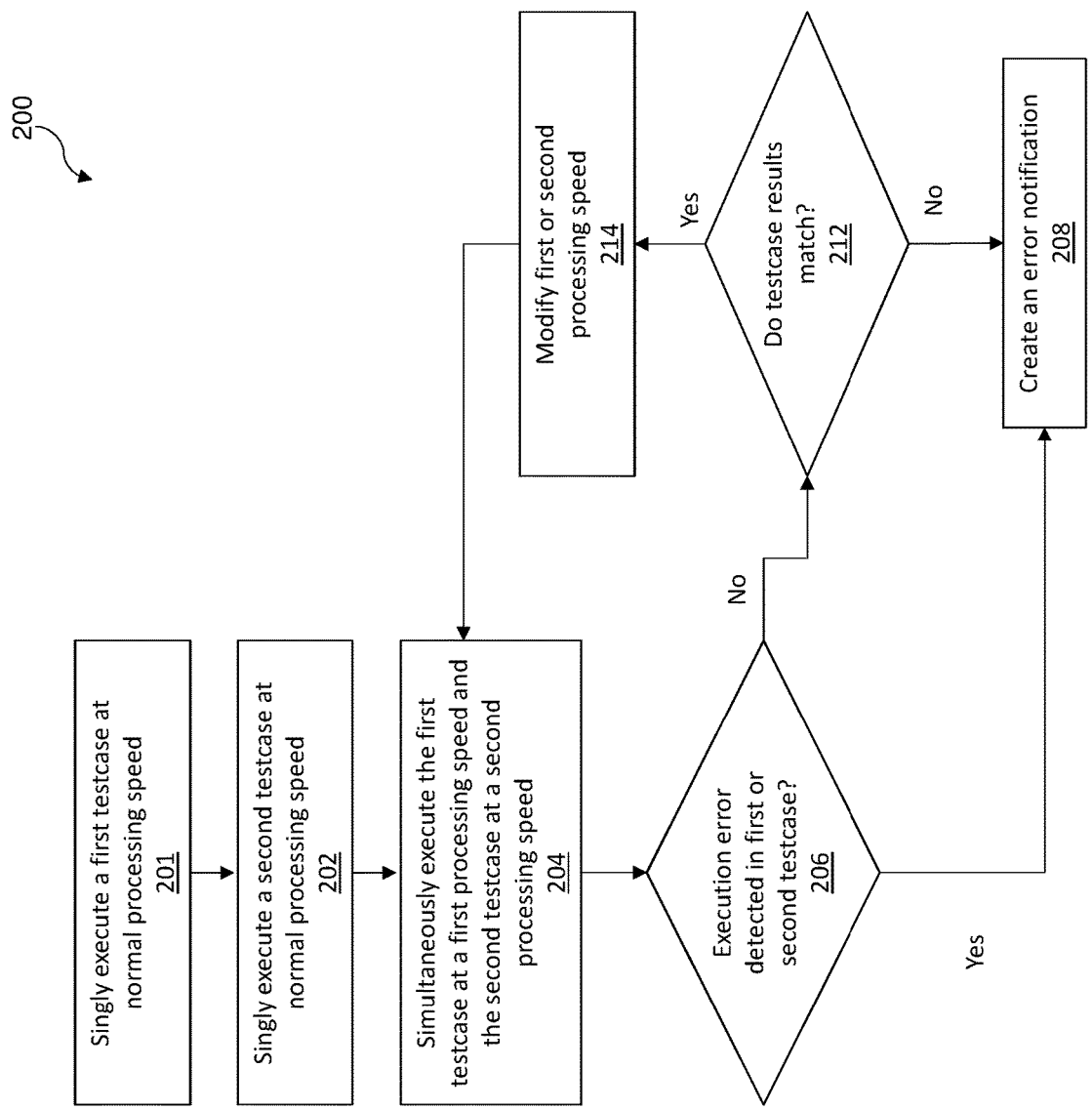
FIG. 2 depicts a flow diagram of a method for identifying software interaction defects using differential speed processors according to one or more embodiments of the present invention.

Turning now to FIG. 2, a flow diagram of a method 200 for identifying software interaction defects using differential speed processors is generally shown in accordance with one or more embodiments of the present invention. The method 200 shown in FIG. 2 may be executed by an operating system, such as Software 411 of FIG. 4, executing on a computer processor. The method 200 includes singly executing a first testcase at normal processing speed as shown in block 201 and singly executing a second testcase at normal processing speed as shown in block 202. Next, as shown at block 204, the method 200 includes simultaneously executing the first testcase at a first processing speed and the second testcase at a second processing speed. In exemplary embodiments, the first and second processing speeds are different from one another by at least 10%. The method 200 also includes detecting an error in the first or second testcases, as shown at decision block 206. In exemplary embodiments, error detection is performed for singly and simultaneously run testcases. In exemplary embodiments, testcase errors are detected from unexpected results, abnormal termination, or failure to complete.

Figure 3:
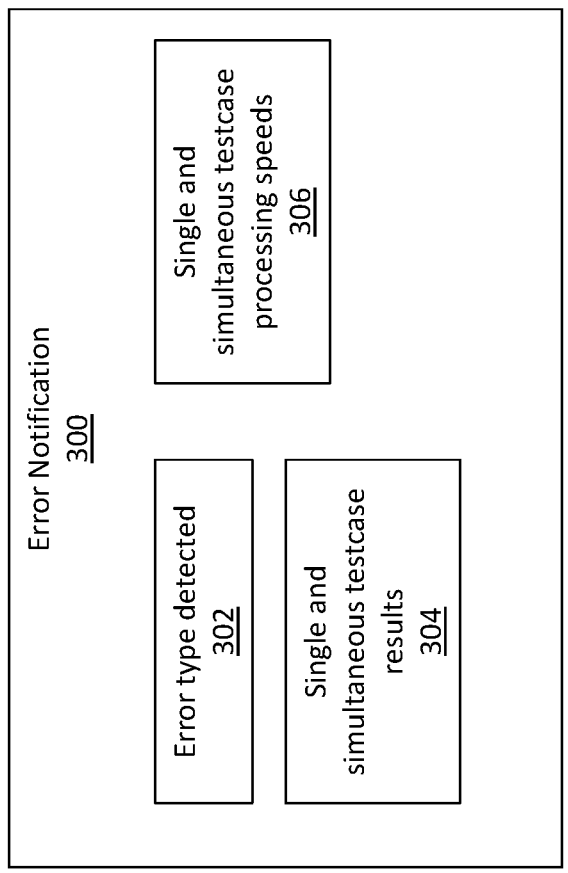
FIG. 3 depicts a block diagram of an error notification according to one or more embodiments of the present invention.

If decision block 206 detects a testcase error, the method 200 proceeds to block 208 and creates an error notification, such as the one shown in FIG. 3.

If decision block 206 does not detect a testcase error, the singly and simultaneous testcase results are compared. Next, if decision block 212 determines the single and simultaneous testcase results match, method 200 proceeds to block 214 to modify the first or second processing speed and continues with block 204. However, if decision block 212 determines the single and simultaneous testcase results do not match, method 200 proceeds to block 208 and creates an error notification.

In exemplary embodiments, the blocks 204, 206, 212, and 214 iterate for a test determined set of processor speeds or until completion or creation of an error notification in block 208. During each iteration, the first or second processing speed is varied at block 214. In one embodiment, the processing speeds used during each test are configured by a software tester. The flow diagram of FIG. 2 is not intended to indicate that the operations of method 200 are to be executed in any particular order, or that all of the operations of method 200 are to be included in every case. Additionally, method 200 can include any suitable number of additional operations.

In one embodiment, when a software test is being performed at a system level, the operating system sets the processor speed based on the work being executed. In this embodiment, the operating system sets the processor speed for a testcase or application instance. In this embodiment, iterating changes the desired speed for testcases or application instances. In another embodiment, the operating system sets the processor speed on a per processor basis. In this embodiment, the operating system runs testcases or application instances on a processor running at the desired speed. In this embodiment, when iterating, testcases or application instances are moved to a different processor to run at the desired speed.

Turning now to FIG. 3, a block diagram of an error notification 300 according to one or more embodiments of the present invention is shown. In an exemplary embodiment, the error notification 300 includes the error type detected 302. In this embodiment, the error type detected 302 includes unexpected results, abnormal termination, or failure to complete. In addition, the error type detected 302 includes an identification of the testcase associated with the error. Furthermore, the error notification 300 includes single and simultaneous testcase results in block 304 and single and simultaneous testcase testcase processing speeds in block 306.

Figure 4:
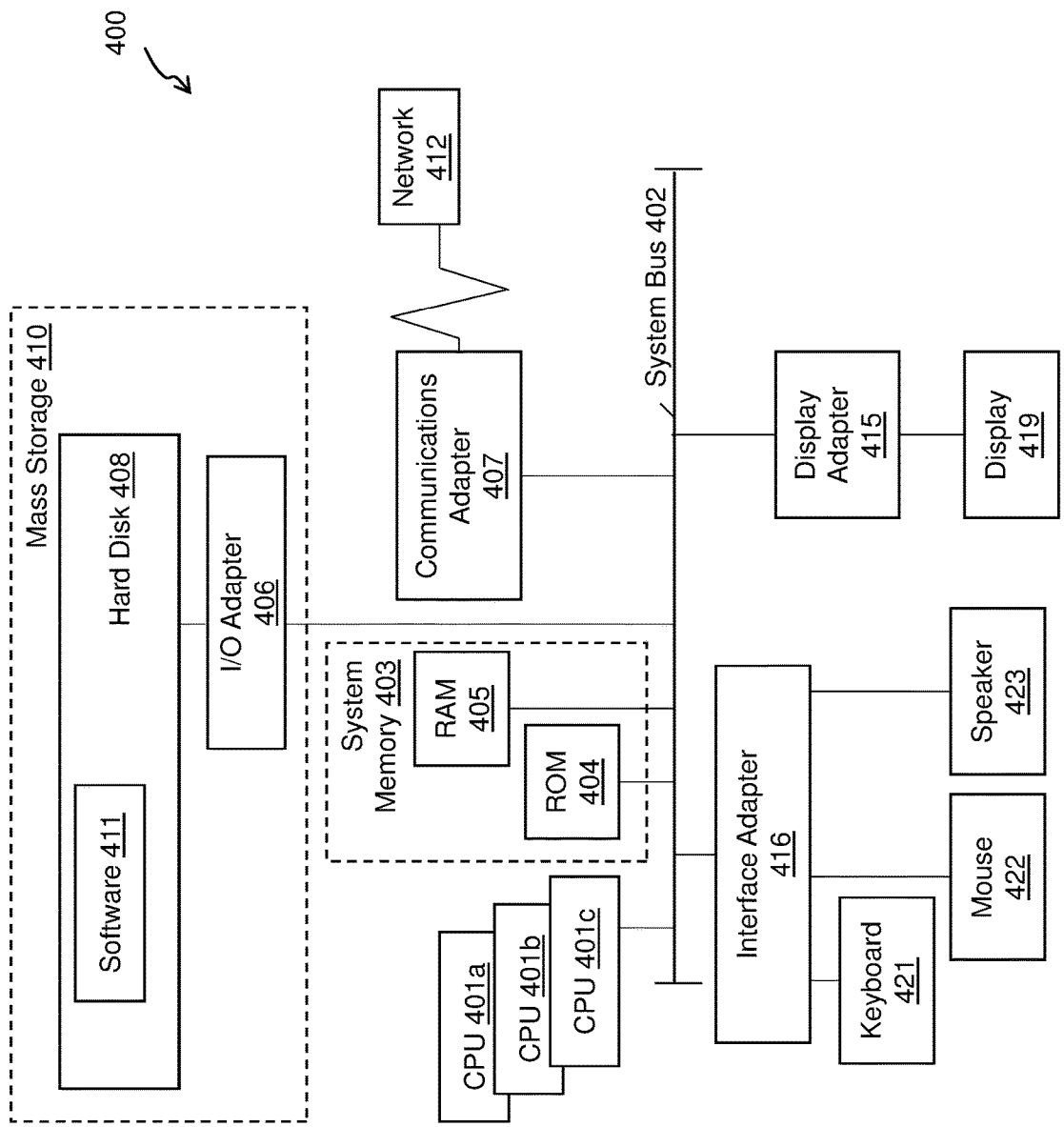
FIG. 4 depicts a computer system according to one or more embodiments of the present invention.

Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processors (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 4.

Additional input/output devices are shown as connected to the system bus 402 via a display adapter 415 and an interface adapter 416 and. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for identifying interaction software defects, the method comprising:
    singly executing a first testcase at a normal processing speed;
    singly executing a second testcase at the normal processing speed;
    simultaneously executing the first testcase at a first processing speed and a second testcase at a second processing speed;
    based on determining the single and simultaneous testcase results do not match, creating an error notification; and
    based on determining the single and simultaneous testcase results match, simultaneously executing the first testcase at a third processing speed and the second testcase at a fourth processing speed.

2. The method of claim 1, wherein a processor speed is decreased by adding no-op instructions and the processor speed increased by removing no-op instructions.

3. The method of claim 1, wherein the first and second processing speeds are different.

4. The method of claim 1, wherein the first and second processing speeds are the same.

5. The method of claim 1, wherein application instances singly execute with normal processing speed and simultaneously execute with different processor speeds.

6. The method of claim 1, wherein single and simultaneous testcase errors create an error notification.

7. The method of claim 1, wherein creating the error notification includes at least one of:
    an error type detected and testcase identification;
    single and simultaneous testcase results; and
    single and simultaneous testcase processing speeds.

8. A system comprising:
    one or more processors for executing computer-readable instructions, the computer-readable instructions controlling the one or more processors to perform operations comprising:
        singly executing a first testcase at a normal processing speed;
        singly executing a second testcase at the normal processing speed;
        simultaneously executing the first testcase at a first processing speed and a second testcase at a second processing speed;
        based on determining the single and simultaneous testcase results do not match, creating an error notification; and
    based on determining the single and simultaneous testcase results match, simultaneously executing the first testcase at a third processing speed and the second testcase at a fourth processing speed.

9. The system of claim 8, wherein a processor speed is decreased by adding no-op instructions and the processor speed increased by removing no-op instructions.

10. The system of claim 8, wherein the first and second processing speeds are different.

11. The system of claim 8, wherein the first and second processing speeds are the same.

12. The system of claim 8, wherein application instances singly execute with normal processing speed and simultaneously execute with different processor speeds.

13. The system of claim 8, wherein single and simultaneous testcase errors create an error notification.

14. The system of claim 8, wherein creating the error notification includes at least one of:
    an error type detected and testcase identification;
    single and simultaneous testcase results; and
    single and simultaneous testcase processing speeds.

15. A computer program product comprising a computer-readable storage medium having program instructions embodied therewith, the program instructions executable by a processor to cause the processor to perform operations comprising:
    singly executing a first testcase at a normal processing speed;
    singly executing a second testcase at the normal processing speed;
    simultaneously executing the first testcase at a first processing speed and a second testcase at a second processing speed;
    based on determining the single and simultaneous testcase results do not match, creating an error notification; and
    based on determining the single and simultaneous testcase results match, simultaneously executing the first testcase at a third processing speed and the second testcase at a fourth processing speed.

16. The computer program product of claim 15, wherein a processor speed is decreased by adding no-op instructions and the processor speed increased by removing no-op instructions.

17. The computer program product of claim 15, wherein the first and second processing speeds are different.

* * * * *